Oct. 17, 1967  E. VAN EIMEREN  3,347,501
ENGINE SUSPENSION
Filed Aug. 19, 1966
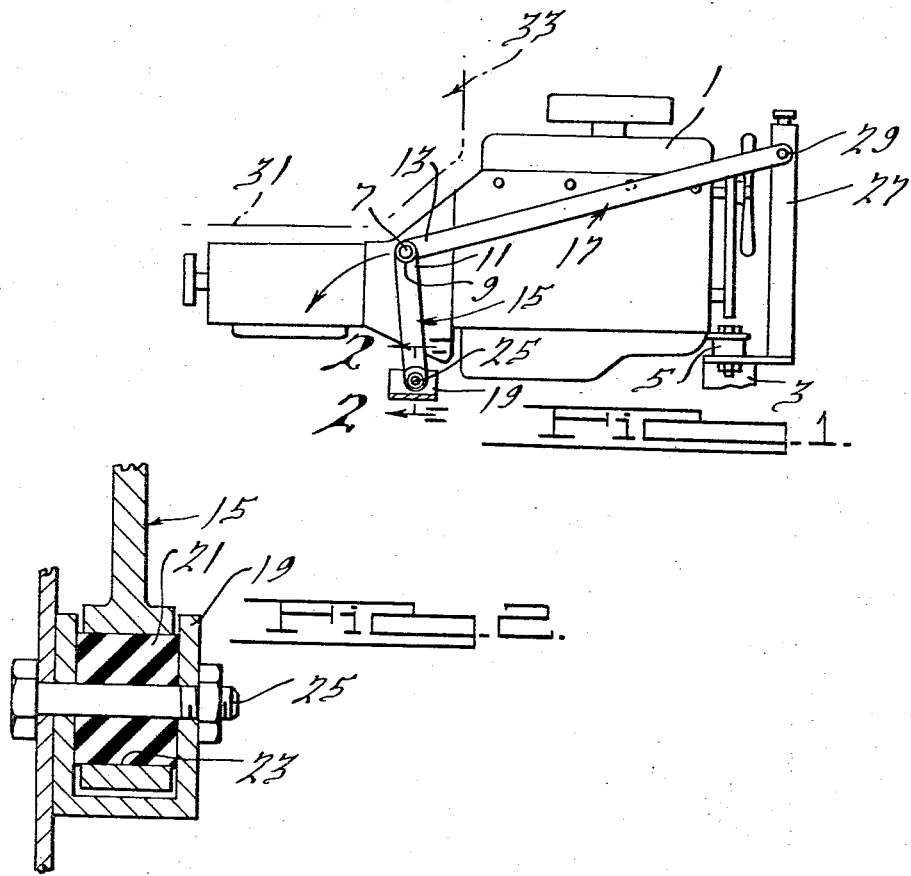
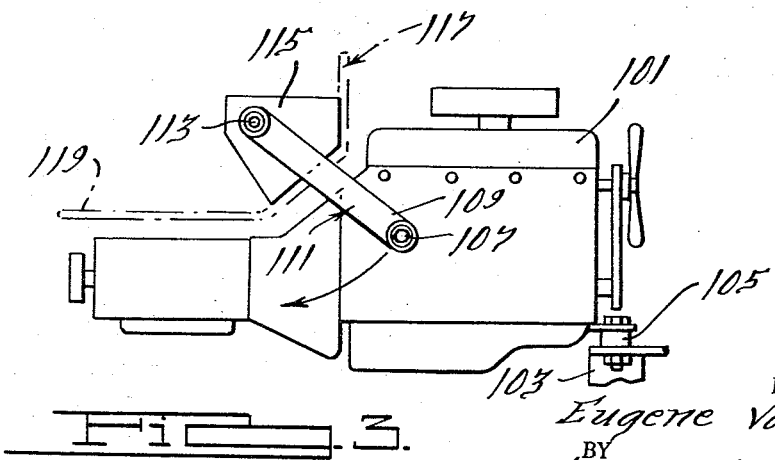
INVENTOR.
Eugene Van Eimeren
BY
Harness, Dickey & Pierce
ATTORNEYS.

United States Patent Office 3,347,501
Patented Oct. 17, 1967

3,347,501
ENGINE SUSPENSION
Eugene Van Eimeren, Racine, Wis., assignor to Walker Manufacturing Company, Racine, Wis., a corporation of Delaware
Filed Aug. 19, 1966, Ser. No. 573,630
7 Claims. (Cl. 248—8)

My invention relates to the mounting or support of an internal combustion engine.

It is well known that many serious injuries in automobile accidents are caused by displacement of the engine into the passenger compartment upon front end impact. It is the object of this invention to provide a means for mounting the engine in such a manner that front impacts will displace the engine along a path that avoids the passenger compartment.

In accordance with the invention the rear end of the engine is supported on a pair of links and the points of support are located so that horizontal force on them causes the links to point in a direction to lower them. Preferably, the links are connected to force transmitting members which move prior to the effect of impact on the links to act as crash sensors.

The invention is illustrated in the accompanying drawings in which:

FIGURE 1 is a schematic side elevation of an internal combustion engine mounted in accordance with the invention;

FIGURE 2 is an enlarged section along the line 2—2 of FIGURE 1; and

FIGURE 3 is a schematic side elevation of a modified form of engine mounting.

As seen in FIGURE 1 the automobile engine 1 is supported at opposite sides of its front end on a chassis member 3 by means of resilient mountings 5 of a conventional type. The rear of the engine 1 is supported on opposite sides along a horizontal axis 7 by pivotal connection at 9 to the pivotally interconnected ends 11 and 13 of links 15 and 17 respectively. The weight of the rear of the engine is borne mainly by support links 15 which are pivotally supported at their bottom ends inside channel chassis members 19 by means of suitable bearings such as typified by the rubber bushing 21 which is held in place in link socket 23 by the through-bolt 25. The front end of sensors links 17 are pivoted to opposite sides of the radiator 27 as indicated at 29.

In operation, a front end impact on an automobile containing the structure just described will first of all move the radiator 27 rearwardly relatively to the rest of the chassis. This movement is transmitted at once by the sensor links 17 to the pivot connections 9 of the links with the rear of the engine and tends to move the axis 7 rearwardly, and does move it rearwardly if the force of the impact is great enough to shear the front mounts 5. Movement of axis 7 is controlled by links 15 and falls in an arc with the axis of bushings 21 as the center. Accordingly, rearward movement of axis 7 is accompanied by a substantial downward movement that causes the engine 1 to dive below the passenger compartment 31, the compartment being contained in the body 33 which is mounted on the chassis.

In FIGURE 3, the engine 101 is supported on its front end on chassis member 103 by means of resilient mountings 105 of an available type. The rear of the engine is pivotally attached on opposite sides along a horizontal axis 107 to the lower ends 109 of a pair of upwardly and rearwardly extending links 111. The upper ends of the links 111 are pivoted at 113 to reinforced sections 115 of the vehicle body 117.

In operation of the embodiment of FIGURE 3, a front impact on the engine 101 of sufficient magnitude to shear the front mounts 105 will free the engine so that it swings on links 111. This movement will occur about the axis of upper link pivots 113 so that there is a downward component of movement causing the engine to dive below the passenger compartment 119.

Modifications may be made without departing from the spirit and scope of the invention.

I claim:

1. In an automotive type vehicle having a chassis means, a body means including a passenger compartment mounted on the chassis means, and an engine located forwardly of the passenger compartment, support members mounting the front end of the engine on the chassis means, and support and guide means mounting the rear of the engine on one of said means, said support and guide means being connected to the engine along a horizontal axis and movable rearwardly with the engine relative to the passenger compartment in the event of front impact and imparting a downward component of movement to the engine during rearward engine movement so that the engine moves substantially beneath the passenger compartment.

2. A device as set forth in claim 1 wherein said support means comprises a pair of links located on opposite sides of the engine and having an end pivoted to the engine along said horizontal axis, the other ends of the links being pivoted to one of said means and located so that rearward movement of said horizontal axis also causes said axis to move downwardly.

3. A device as set forth in claim 2 wherein the other ends of the links are pivoted to the chassis means.

4. A device as set forth in claim 2 wherein the other ends of the links are pivoted to the body means.

5. A device as set forth in claim 1 including impact sensor means for initiating movement of said horizontal axis substantially instantaneously with said front impact.

6. A device as set forth in claim 5 wherein said sensor means comprises links connecting said horizontal axis to structure at the extreme forward end of the car.

7. A device as set forth in claim 6 wherein said structure comprises a radiator for the engine.

References Cited

UNITED STATES PATENTS

| 2,062,128 | 11/1936 | Hamerstadt | 248—17 |
| 2,108,515 | 2/1938 | Summers | 248—3 X |
| 2,266,116 | 12/1941 | Best | 180—64 |
| 3,139,152 | 6/1964 | Bayer | 180—64 |

JOHN PETO, *Primary Examiner.*